(12) United States Patent
English (10) Patent No.: US 6,314,652 B1
(45) Date of Patent: Nov. 13, 2001

(54) MULTI-PURPOSE, MULTI-FUNCTIONAL TOOL

(75) Inventor: John T. English, Hanover, MA (US)

(73) Assignee: Versa Technologies, Inc., MA (US)

( * ) Notice: Subject to any disclaimer, the term of this patent is extended or adjusted under 35 U.S.C. 154(b) by 0 days.

(21) Appl. No.: 09/309,044

(22) Filed: May 10, 1999

Related U.S. Application Data (60) Provisional application No. 60/096,605, filed on Aug. 14, 1998.

(51) Int. Cl.⁷ ..................................................... B43L 7/10
(52) U.S. Cl. ................................ 33/421; 33/451; 33/481; 33/419
(58) Field of Search ..................... 33/418, 419, 420–426, 33/415, 417, 451, 452, 465, 468, 469, 471, 473, 562–566, 416, 427, 464, 470, 472

(56) References Cited

U.S. PATENT DOCUMENTS

| | | | |
|---|---|---|---|
| 290,092 | 12/1883 | Button | 24/114.7 |
| 1,083,376 | 1/1914 | Robinson | 33/451 |
| 1,191,008 | 7/1916 | Laakkonen | 33/423 |
| 1,342,232 | 6/1920 | Scott | 33/423 |
| 1,827,014 | 10/1931 | Jannell | 33/423 |
| 2,023,539 | 12/1935 | Packard | 33/423 |
| 2,110,636 | 3/1938 | Sharp | 33/465 |
| 2,189,245 | 2/1940 | Guinez | 33/471 |
| 2,247,327 | 6/1941 | Brady | 33/451 |
| 2,487,700 | 11/1949 | Free | 33/424 |
| 2,495,645 | 1/1950 | Schultes et al. | 33/343 |
| 2,556,781 | 6/1951 | Smithson | 33/423 |
| 2,631,376 | 3/1953 | Callahan | 33/424 |
| 2,640,268 | 6/1953 | Thompson | 33/451 |
| 2,659,976 | 11/1953 | Callahan | 33/341 |
| 2,666,261 | 1/1954 | Buick | 33/424 |
| 2,726,452 | 12/1955 | Maupin | 33/423 |
| 2,728,989 | 1/1956 | Laggren | 33/348 |
| 2,728,990 | 1/1956 | Murch | 33/424 |
| 2,867,906 | 1/1959 | Lee | 33/93 |
| 2,878,569 | 3/1959 | Metrulis | 33/451 |
| 2,939,947 | 6/1960 | Schultz | 33/348.2 |
| 3,009,250 | 11/1961 | Schock | 33/388 |
| 3,112,568 | 12/1963 | Baker | 33/421 |
| 3,266,156 | 8/1966 | Debs | 33/424 |
| 3,456,353 | 7/1969 | Iams | 33/429 |
| 3,513,551 | 5/1970 | Geiger | 33/420 |
| 3,513,558 | 5/1970 | Kuchta et al. | 33/581 |

(List continued on next page.)

FOREIGN PATENT DOCUMENTS

| | | | |
|---|---|---|---|
| 119812 | 6/1900 | (DE) | 33/426 |
| 548232 | 10/1941 | (GB) | 33/419 |

Primary Examiner—Diego Gutierrez
Assistant Examiner—Gail Verbitsky
(74) Attorney, Agent, or Firm—Perkins, Smith & Cohen, LLP; Jacob N. Erlich; Jerry Cohen (57) ABSTRACT

A multi-purpose, multi-function tool of compact design made up of a plurality of components having levels thereon which interact together to provide a single tool which can perform a number of various functions or purposes within the design or construction industry. The tool having a support of predetermined thickness and being of a substantially triangular-shaped configuration defining a pair of legs and a hypotenuse. An edge member is situated on one of the legs of said support structure, the edge member being of a predetermined thickness greater than the predetermined thickness of the support structure for supporting the support structure on a surface. A rotatable member is pivotally mounted on the support structure for selective rotational movement with respect thereto and a curved extension protruding from the rotatable member having degree and rise markings thereon. A locking mechanism is operably interconnected with the curved extension to hold the curved extension and rotatable member in a selected position with respect to the support structure.

18 Claims, 8 Drawing Sheets

U.S. PATENT DOCUMENTS

| | | | |
|---|---|---|---|
| 4,121,344 | 10/1978 | Goussios | 33/427 |
| 4,194,295 | 3/1980 | Simuro et al. | 33/458 |
| 4,461,092 | 7/1984 | Hore | 33/474 |
| 4,700,489 | 10/1987 | Vasile | 33/342 |
| 4,712,307 | 12/1987 | Kish | 33/421 |
| 4,745,689 | 5/1988 | Hiltz | 33/451 |
| 4,779,354 | 10/1988 | Hill | 33/640 |
| 4,955,141 | 9/1990 | Welch | 33/418 |
| 5,090,129 * | 2/1992 | Cunningham | 33/562 |
| 5,117,560 | 6/1992 | Nevins | 33/471 |
| 5,187,877 | 2/1993 | Jory et al. | 33/640 |
| 5,459,935 | 10/1995 | Paulson et al. | 33/451 |
| 5,894,675 | 4/1999 | Cericola | 33/451 |

\* cited by examiner

MULTI-PURPOSE, MULTI-FUNCTIONAL TOOL

CROSS-REFERENCE TO RELATED APPLICATIONS

This application claims priority of U.S. provisional application Ser. No. 60/096,605, entitled, "Multi-Purpose, Multi-Functional Tool" filed Aug. 14, 1998 by the present applicant.

BACKGROUND OF THE INVENTION

This invention relates generally to tools used by carpenters and craftsmen, primarily in the design and construction industry and, more particularly, to a tool which is capable of performing a wide variety of functions, easily and accurately, for a number of different design and construction purposes, and capable of being used by a variety of individuals ranging from handymen to construction workers.

There are approximately 60,000,000 architects, engineers, carpenters, framers, sidewallers, finish carpenters, cabinet makers, plumbers, electricians, site contractors, masons, plasters, and home handymen and women that have the need to use tools and instruments that perform a wide variety of design and construction functions. These tools can be used as squares, levels, protractors, rulers, plumbs, rafter framing and rotatable functional members, grade indicators, degree markers, bevel protractors, etc. In fact, it is not uncommon for an individual who uses such tools to carry with them at one time as many as 8–10 different tools to perform such above-named operations.

Through the years many tools have been manufactured, with each tool being used for a particular purposes. Examples of such tools or devices which can be found in the prior art are exemplified by the following U.S. Pat. No. 5,459,935 (level square); U.S. Pat. No. 5,187,877 (craftsman's adjustable angle instrument); U.S. Pat. No. 4,955,141 (adjustable pivot angle square); U.S. Pat. No. 4,779,354 (variable angle protractor; U.S. Pat. No. 4,712,307 (rafter rotatable functional member); U.S. Pat. No. 3,009,250 (spirit level and grade indicator); U.S. Pat. No. 2,939,947 (utility pocket level); U.S. Pat. No. 2,878,569 (combination level, rule and protractor device); U.S. Pat. No. 2,728,990 (degree marking addition to a carpenter's combination square); U.S. Pat. No. 1,827,014 (bevel protractor for rafters); U.S. Pat. No. 2,666,261 (drafting instrument); U.S. Pat. No. 3,266,156 (draftsman's and engineer's drawings and trigonometric instrument); U.S. Pat. No. 1,083,376 (combination measuring instrument); and U.S. Pat. No. 1,342,232 (combination roof framing tool).

The problems of the past include the of carrying and maintaining a plurality of such tools becomes quite cumbersome and expensive problem. Furthermore, there are instances when a specific tool is needed to perform a particular task and the ready availability of such a tool may be lacking. In addition, past attempts at solving the above problems generally resulted in cumbersome tools which lacked simplicity, robustness and accuracy in use.

It is therefore an object of this invention to provide multi-purpose, multi-functional tool which overcomes the need of a craftsman or the like to maintain a plurality of tools to perform a variety of design or construction tasks.

It is another object of this invention to provide a multi-purpose, multi-functional tool which is capable of accomplishing a wide variety of tasks in an accurate manner.

It is still a further object of this invention to provide a multi-purpose, multi-functional tool which substantially reduces the cost associated with the purchasing of numerous individual tools.

It is an even further object of this invention to provide a multi-purpose, multi-functional tool which permits ease of manufacture and low cost of assembly.

SUMMARY OF THE INVENTION

The objects set forth above as well as further and other objects and advantages of the present invention are achieved by the embodiments of the invention described hereinbelow.

The present invention provides a multi-purpose, multi-functional tool which is made up of a support structure having a substantially triangular-shaped configuration and which defines a pair of legs and a hypotenuse. An edge matter is situated on one of the legs so as the support the structure on a surface, while a series of level determining means are located on the support structure adjacent to each of the legs. A rotatable member is pivotally mounted on the support structure and is capable of selective rotational movement with respect to the support structure. It also has a level located thereon. A curved extension protrudes from the rotatable member and has a series of degree and rise markings thereon. A locking mechanism is utilized to hold the curved extension of the rotatable member in a preselected position with respect to the support structure.

By proper utilization of the multi-purpose, multi-function tool of the present invention. The tool can easily be used as a protractor, a means for determining roof pitch and angles, to convert pitches and rises to degrees and vice-a-versa, to determine miter cuts, to perform leveling functions, to determine pitches or slopes, to act as a rugged saw guide and a for variety of other operations as well. The device is simple to use, yet extremely accurate in obtaining readings.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

Figure 1:
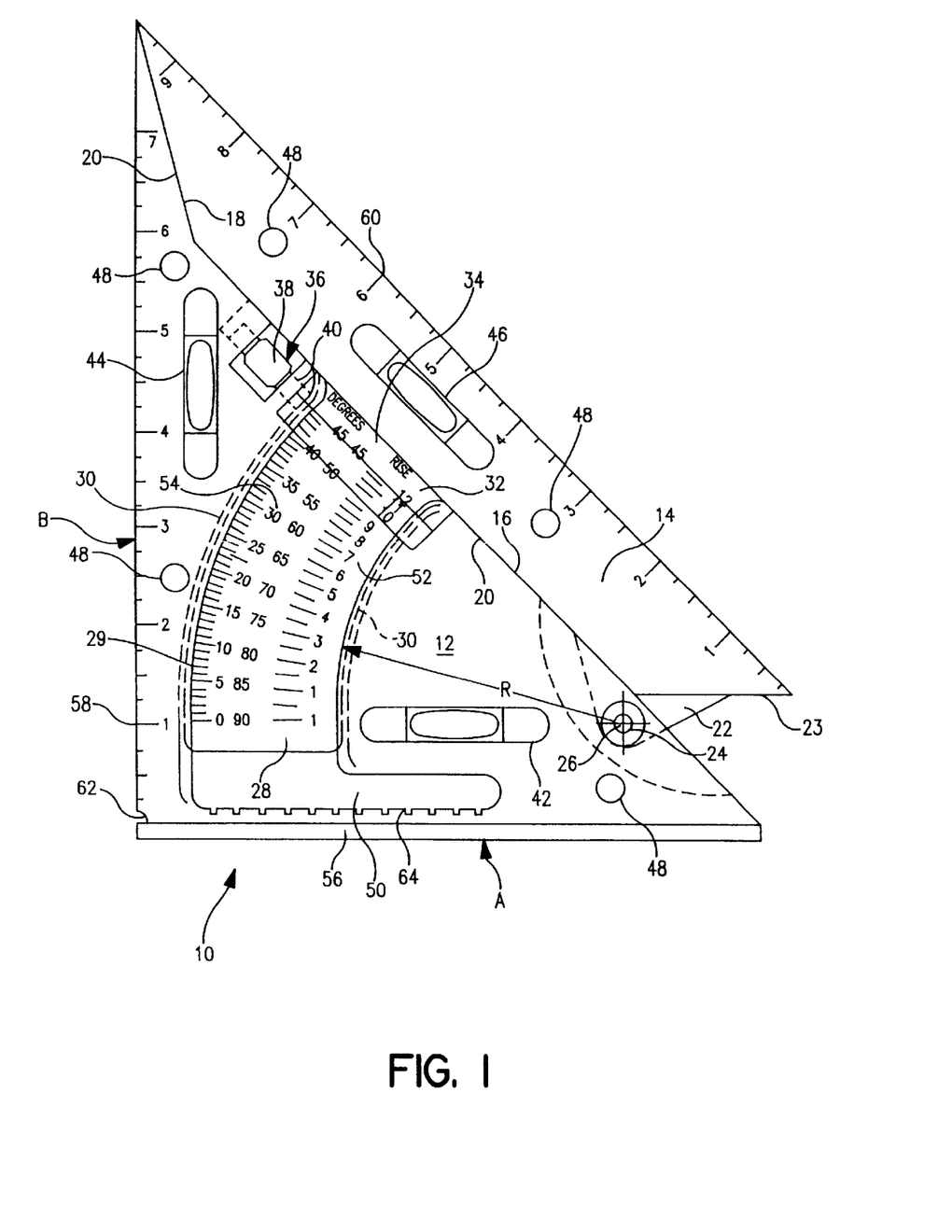
FIG. 1 shows a side elevational view of the multi-purpose, multi-functional tool of this invention.

Reference is now made to FIG. 1 of the drawings which illustrate a side view the multi-purpose, multi-function tool 10 of the present invention made up of a compact design and encompassing a single tool which can perform a number of various functions or purposes within the design or construction industry. For example, tool 10 acts as a protractor to measure angles instantly and accurately from 0–90 degrees in any quadrant; it is capable of determining any existing roof pitch instantly and accurately; it determines any angle instantly and accurately; it has the capability of instantly converting pitches and rises to degrees and vice versa; it can determine miter cuts instantly and accurately; it is capable of performing all leveling functions from horizontal to 90 degrees in any quadrant; it is capable of leveling countertops, furniture, appliances, etc. in three directions simultaneously; it determines pitches or slopes of drains, duct work and site piping; acts as a rugged saw guide and can be used for even a further and wider variety of other operations similar to the above. A key advantage of the tool 10 of the present invention is that it extremely simple to use and yet enables the user to obtain accurate readings while still being easy to handle and extremely rugged in construction.

More specifically, and still referring to FIG. 1 of the drawings, the multi-purpose, multi-functional tool 10 is made up of two major components: a main functional support structure 12 and a rotatable functional member 14. The main support structure 12 is shaped substantially in the form of a triangle while the rotatable functional member 14 has a substantially elongated configuration in the form of a straight edge. Together these components 12 and 14 pivotally mate together to also form a substantially triangular configured tool 10. More specifically, the outer leg (hypotenuse) of the main support structure 12 has a straight portion 16 and angled or tapered portion 18 which matingly engages the bottom surface 20 of rotatable functional member 14.

Figure 3:
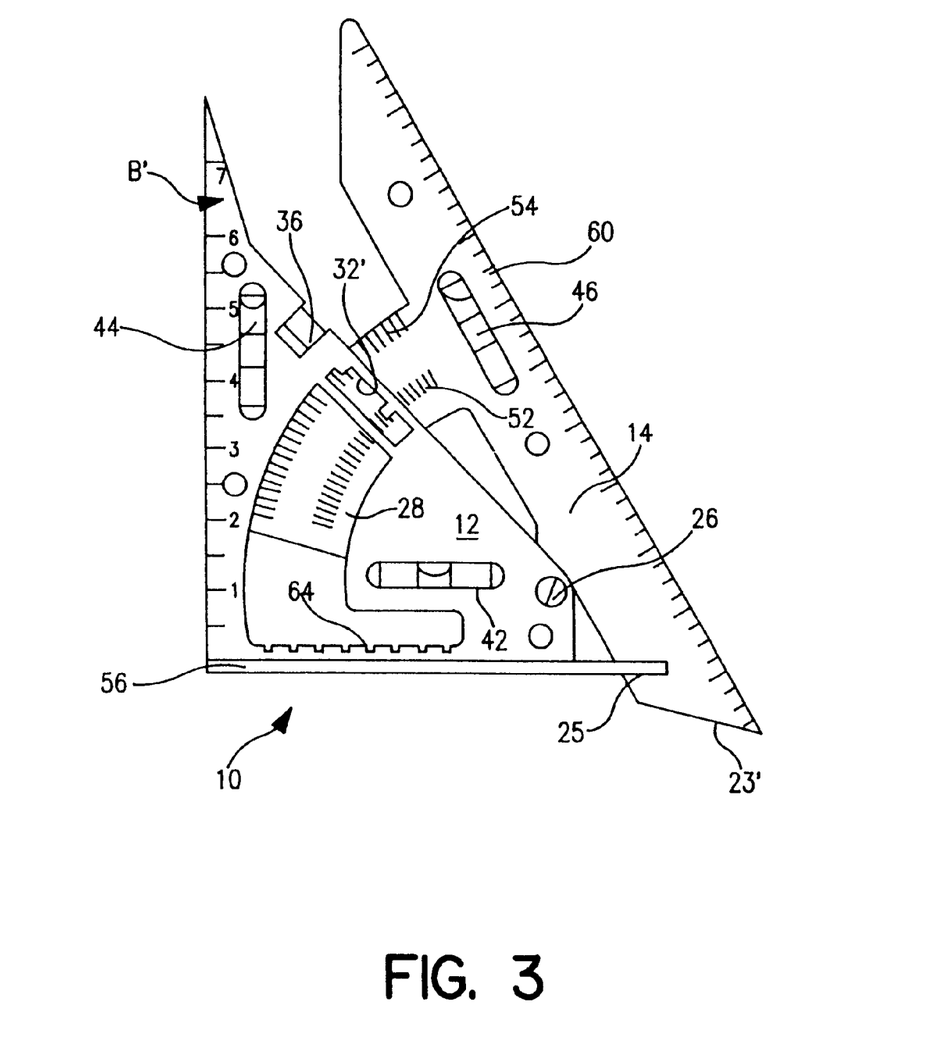
FIG. 3 shows a side view elevational view of the multi-purpose, multi-functional tool of this invention in the slightly open position and having an extended rotatable, functional member.

The rotatable functional member 14 is pivotally secured adjacent one end thereof 22 to support structure 12 by a conventional pivotal connection mechanism 24 made up, for example of a pivot pin or rivet 26. This arrangement permits the rotatable functional member 14 to easily rotate with respect to support structure 12. As shown in FIG. 1, rotatable member 14 has an end 23 which abuts support structure 12 in the open position adjacent edge member 56 or, in the alternative, as shown in FIG. 3, end 23' extends beyond edge member 56. A slot 25 can be formed in edge member 56 to accept the passing therethrough of the end of rotatable member 14. This extended end 23' permits the full use of markings 60 when the outer edge of rotatable member 14 is to be utilized as a straight edge.

In addition, rotatable functional member 14 has attached thereto or formed as part thereof a curved extension portion 28 whose radius of curvature R is measured about the pivotal connection mechanism 24. The radius R is of a predetermined size such that the overall size of the tool 10 is maintained well within usable limits. This curved extension portion 28 includes a series of markings thereon denoting both rise and degrees of the outer edge of rotatable functional member with respect to the horizontal. The curved extension portion fits within a curved cut-out 29 within support structure 12. Maintaining the curved extension portion 28 in a moveable relationship with respect to the support structure 12 are curved, grooved slots 30 formed within the support structure 12. Grooved slots 30 permit the movement of the curved extension portion 28 to take place when the rotatable functional member 14 is pivoted about its pivot point 48. This arrangement substantially eliminates any unwanted sideward movement of the rotatable, functional member 14 and curved extension 28. In addition, detents can be incorporated with the slots to enable the movement of the rotatable member 14 to take place with positive click stops denoting degrees.

A transparent reference member 32 having a reference mark 34 etched and/or painted thereon is affixed at each end thereof to the support structure 12 adjacent each side of the curved, grooved slot 30. The reference mark 34 is utilized in conjunction with the markings on the curved extension portion 28 to denote rise or degrees. A conventional locking mechanism 36 made up of a knurled knob 38 and threaded rod 40 is utilized to lock the or fixedly secure the curved extension portion 28 with respect to the support structure 12 when the rotatable functional member is moved to a desired location with respect thereto.

As an alternative to transparent reference member 32, in the embodiment shown in FIGS. 3–8, the transparent member 32 is replaced with a viewing portion made up of a cut out portion 32' within support structure 12 having a reference segment for use in conjunction with the markings on the curved extension 28 to denote rise or degrees as shown in FIG. 3.

Referring once again to the support structure 12 each of the two legs A and B of the triangle-shaped support structure 12 and rotatable functional member 14 has an individual leveling device 42 and 44 and 46, respectfully, associated therewith containing any suitable spirit oil and bubble such that tool 10 can be utilized to maintain and determine three degrees of level at any one time. In addition, as many areas as possible of support structure 12 and angle measuring 14 has a series of openings or cutouts 48 therein, including an enlargement 50 of slot 30, in order to effect an extremely lightweight yet structurally sound and robust tool 10.

Referring once again to the rotatable functional member 14, the curved, extension portion 28 has two series of markings thereon. One such series of markings 52 denotes rise while the other series of markings 54 (divided into markings of 0 to 90 degrees) denote degrees with respect to the vertical or horizontal. Further, the markings 52 and 54 are arranged with respect to one another to convert rise to degrees and vice versa. Further description of the use of these markings 52 and 54 with respect to the reference member 32 will be set forth in greater detail below.

Figure 2:
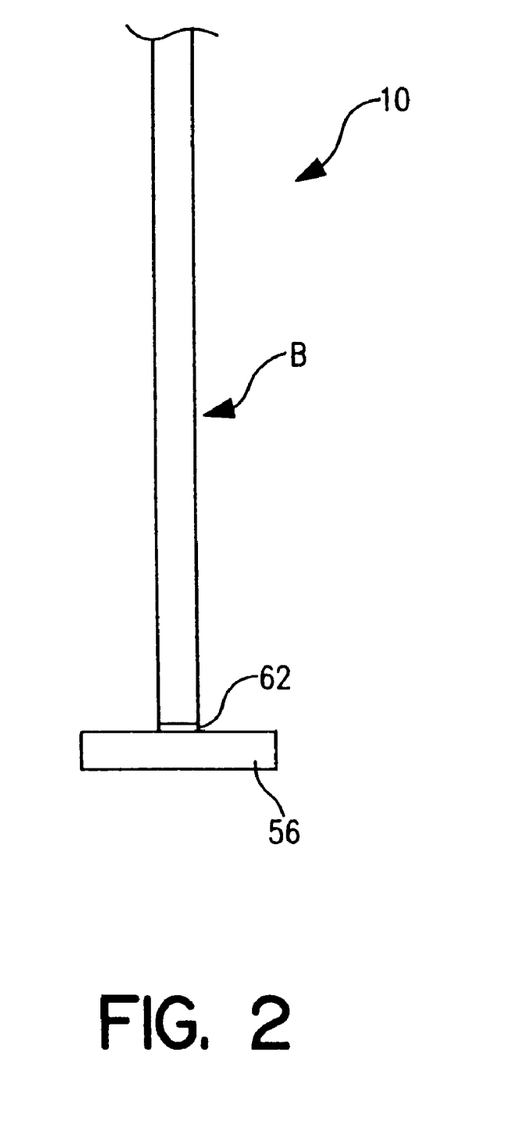
FIG. 2 shows an end view of the bottom portion of the multi-purpose, multi-functional tool of this invention.

Other features of the multi-purpose, multi-functional tool 10 of the present invention include a wide, straight bottom surface edge member 56 formed on one leg or side A of the support structure 12 so as to enable the tool to be easily positioned upon a surface. More specifically as shown in FIG. 2, the preferred width of edge member 56 is approximately 1 inch compared to a width of approximately ⅜ inch for support structure 12 and rotatable functional member 14, although the exact dimensions of the tool 10 may vary to accommodate various operating environments. Along the other leg or side B is a series of markings 58 which may be in inches or centimeters and used as a straight edge or a conjunction with the rotatable functional member 14. A further series of like markings 60 are provided on the outerside of the rotatable functional member 14, and these markings may also be provided in inches or centimeters, as desired.

Additionally, a notch 62 is provided at the intersection of legs A and B of support structure 12 in order to place a pencil point or marker therein to mark a surface or to use in conjunction with a nail or the like as a pivotal point for tool 10. There are also a series of spaced apart notches 64 each preferably, located approximately ½ inch from another other, although the exact spacing can vary within the scope of the present invention. The notches 64 are utilized to provide an indentation for a marking instrument such as a pencil or the like to make a mark on a surface such as a stud.

Reference is now made to FIGS. 4–8 of the drawings which illustrate the multi-purpose, multi-functional tool 10 in various positions of use. These illustrations are examples of only a few of the many uses for tool 10 of the present and should, therefore, not be construed as a limitation to the actual uses for tool 10.

Figure 4:
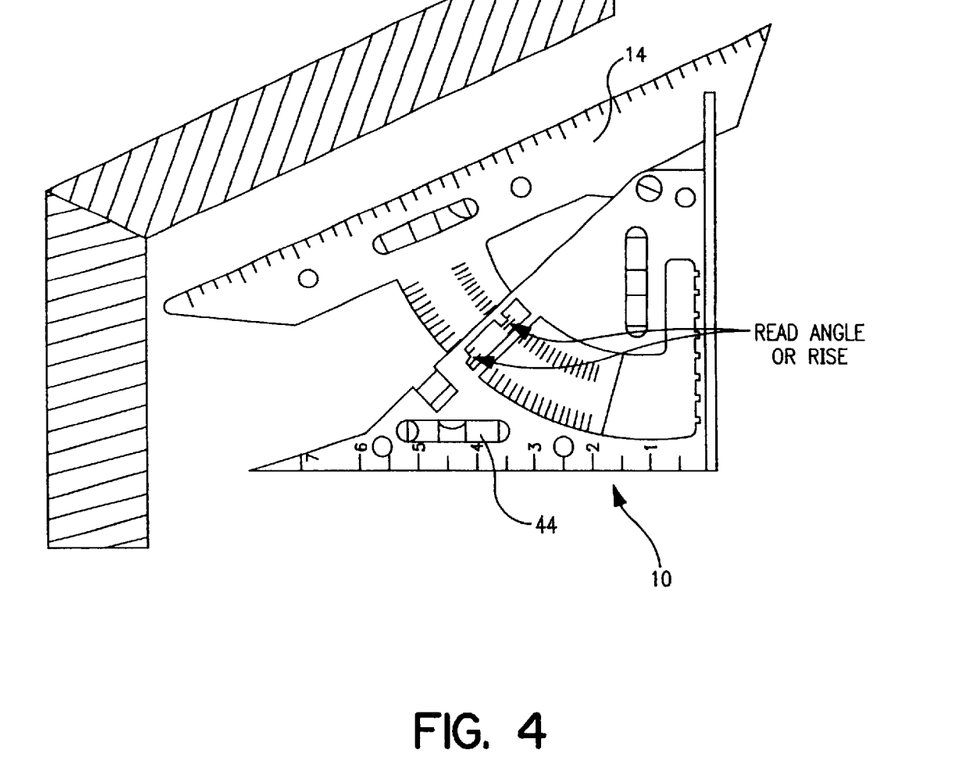
FIGS. 4–8 show a side view elevational view of the multi-purpose, multi-functional tool of this invention in a variety of uses.

For example, tool 10 is shown in FIG. 4 being utilized to determine roof pitches and angles. The tool 10 has its rotatable (adjustable) member 14 positioned against a slope or angle with the bubble in level 44 centered. With such an arrangement it is possible to read the angle or rise from the appropriate scale as indicated in the figure.

Figure 5:
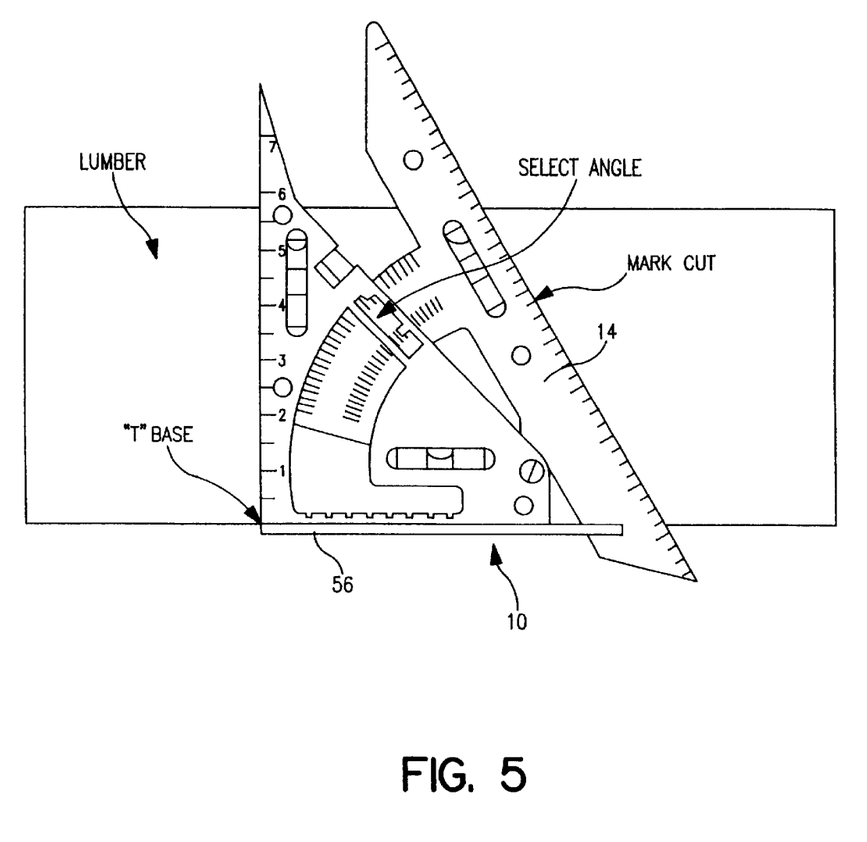

In FIG. 5 of the drawings, the tool 10 of the present invention is shown being utilized to mark plum cuts. This takes place by positioning tool 10 such that the base rests against a piece of lumber and with the rotatable member 14 fixed at the desired angle on the pitch or rise scale, an appropriate plum cut can be marked against the now fixed rotatable member 14.

Figure 6:
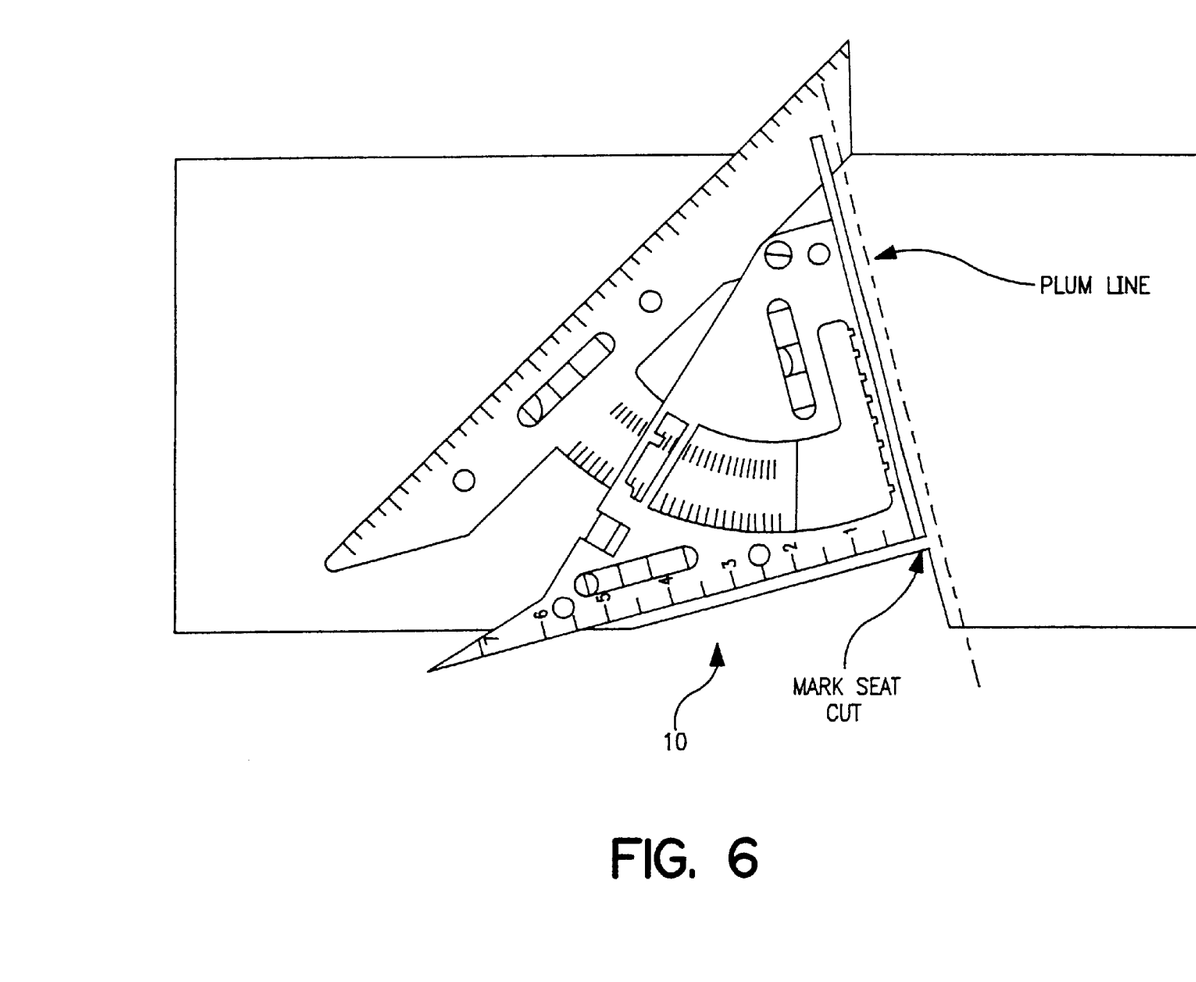

FIG. 6 of the drawings illustrates the use of tool 10 in performing seat cuts wherein the base 56 is placed against the plum cut or line. The tool 10 is positioned to the desired cut length, using the convenient inch scale on the tool as shown in the figure. The seat cut is then marked accordingly.

Figure 7:
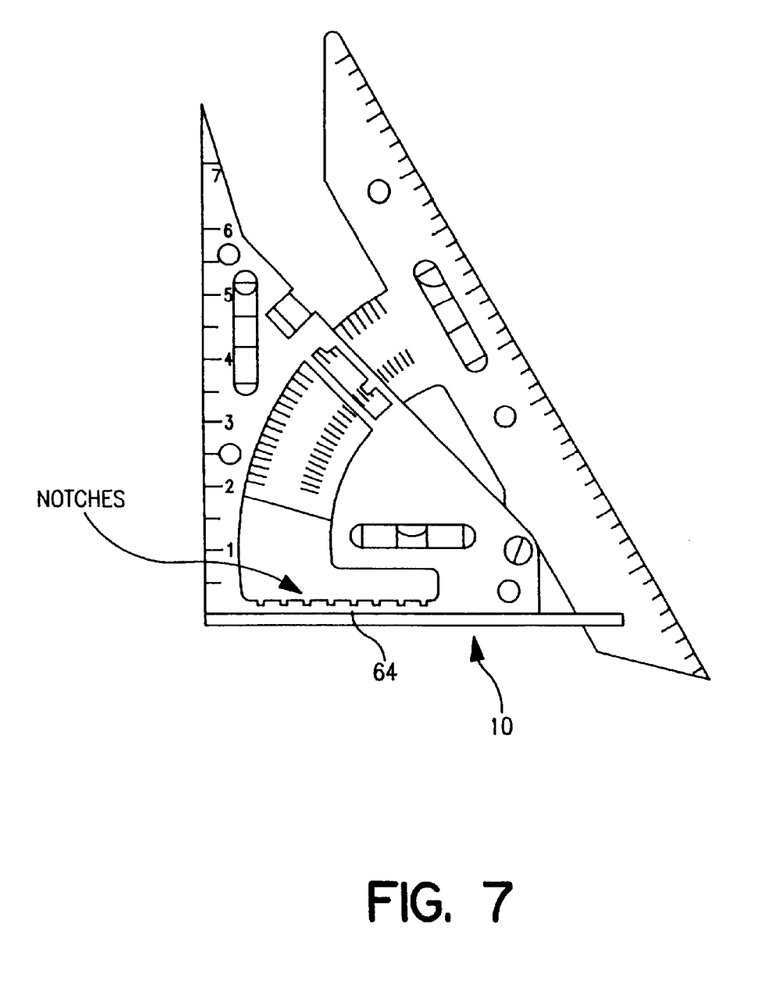

Reference is now made to FIG. 7 of the drawings in which the tool 10 is utilized in a quick layout. In this manner the notches 64, which are conveniently spaced in ¼ inch increments, are utilized for quick and easy layouts.

Figure 8:
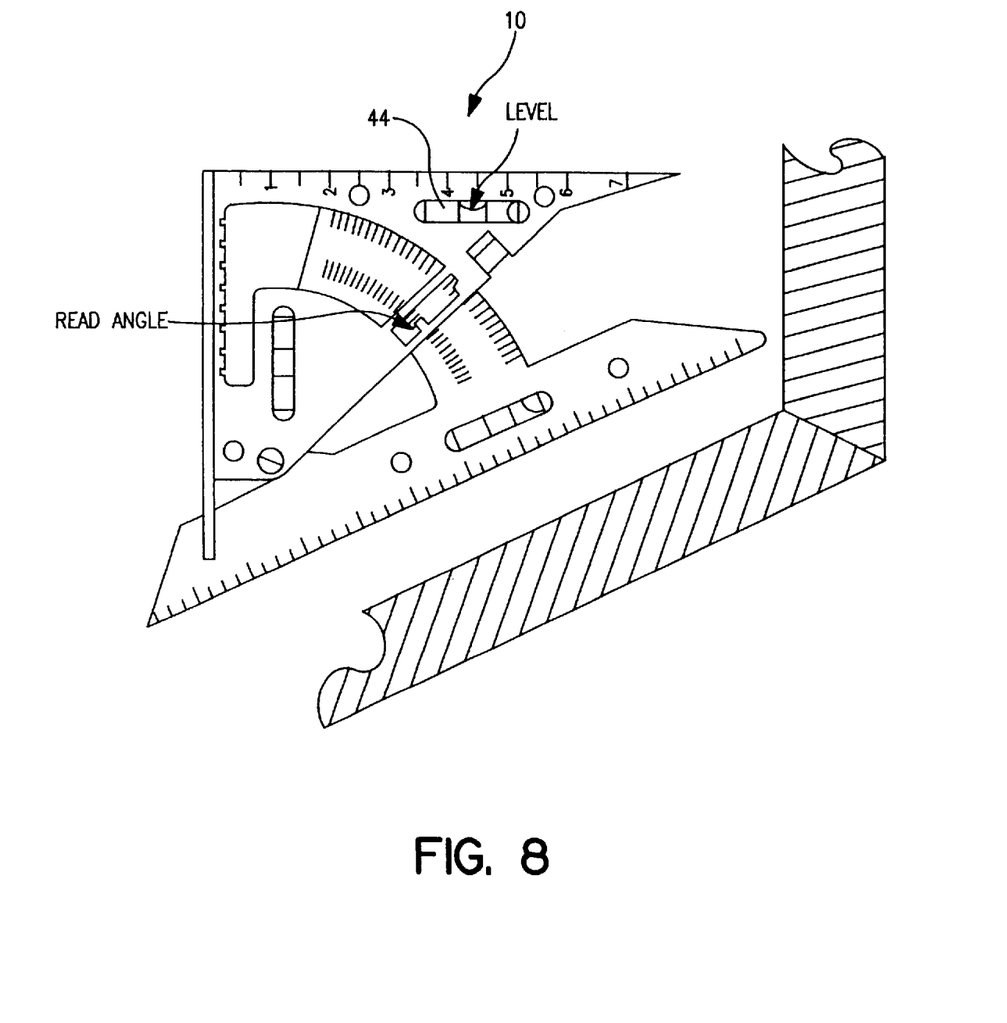

FIG. 8 of the drawings illustrates tool 10 being utilized in determining miter cuts. In this instance, tool 10 is placed in such a manner that the rotatable member 14 is adjusted against an angle with the bubble in level 44 being centered. The angle is then read from the degree scale and divided by two to determine a cut angle.

Although the invention has been described with respect to various embodiments, it should be realized this invention is also capable of a wide variety of further and other embodiments within the spirit and scope of the appended claims. For example, in still a further embodiment (not shown) of the invention an elongated straight edge may be attached to leg B of the support structure 12 in order to enable the tool 10 to determine level of long walls, boards or the like.

What is claimed is:

1. A multi-purpose, multi-functional tool comprising:
    a support structure;
    said support structure being of a substantially triangular-shaped configuration defining a pair of legs and a hypotenuse;
    at least one means for determining level located on said support structure;
    a rotatable member pivotally mounted on said support structure for selective rotational movement with respect to said support structure;
    said rotatable member having means for determining level located thereon;
    a curved extension protruding from said rotatable member for movement therewith, said curved extension having degree and rise markings thereon, said support structure including a cut-out portion for receiving said curved extension therein and grooved slots adjacent said cut-out portion for receiving edges of said curved extension to prevent any unwanted sideward movement of said rotatable member and curved extension to take place with respect to said support structure;
    a locking mechanism operably interconnected with said curved extension to hold said rotatable member in a selected position with respect to said support structure;
    means on said support structure for providing a reference for said markings located on said curved extension;
    said support structure being made of a predetermined thickness; and
    an edge member being on one of said legs of said support structure, said edge member being of a predetermined width, said predetermined width of said edge member being greater than said predetermined thickness of said support structure, with said predetermined width of said edge member being of sufficient size to support said tool on a surface.

2. A multi-purpose, multi-functional tool as defined in claim 1 wherein said pivotal mounting of said rotatable member to said support structure is defined by a pivot point, said pivot point being used to define a radius of curvature for said curved extension.

3. A multi-purpose, multi-functional tool as defined in claim 1 further comprising a first and a second means for determining level located on said support structure adjacent each of said legs, respectively.

4. A multi-purpose, multi-functional tool as defined in claim 3 wherein said support structure further comprises openings therein to act in conjunction with said enlarged portion of said cut-out to lighten the weight of said tool.

5. A multi-purpose, multi-functional tool as defined in claim 3 wherein said means for providing a reference comprises a viewing portion having a reference segment to be used in conjunction with said degree and rise markings.

6. A multi-purpose, multi-functional tool as defined in claim 1 wherein said support structure has a slot with at least one notch therein in order to accommodate a tip of an instrument.

7. A multi-purpose, multi-functional tool as defined in claim 1 wherein said cut-out portion for receiving the curved extension includes said slot.

8. A multi-purpose, multi-functional tool as defined in claim 6 wherein at least one of said legs of said support structure includes at least one notch therein in order to accommodate the tip of an instrument.

9. A multi-purpose, multi-functional tool as defined in claim 1 wherein said means for providing a reference comprises a transparent member having a reference line thereon to be used in conjunction with said degree and rise markings, said transparent member passing over said cut-out to add to the stability of said support structure.

10. A multi-purpose, multi-functional tool as defined in claim 9 wherein said reference line also acts as a means for providing a conversion between said degree and rise markings.

11. A multi-purpose, multi-functional tool as defined in claim 1 wherein said means for providing a reference comprises a viewing portion having a reference segment to be used in conjunction with said degree and rise markings.

12. A multi-purpose, multi-functional tool as defined in claim 1 wherein said locking mechanism is connected between said support structure and said curved extension and includes a releasable locking screw.

13. A multi-purpose, multi-functional tool as defined in claim 1 wherein at an intersection between one of said legs and said hypotenuse of said support structure, one of said legs has a tapered portion, and said rotatable member also has a tapered portion thereon to matingly engage with said tapered portion of said one of said legs.

14. A multi-purpose, multi-functional tool as defined in claim 1 wherein:
    at least one of said legs of said support structure has at least one notch therein in order to accommodate a tip of an instrument;
    said cut-out portion including a slot, said support structure adjacent said slot having at least one notch therein in order to accommodate a tip of an instrument; and said at least one of said legs and said rotatable member having measuring markings thereon.

15. A multi-purpose, multi-functional tool as defined in claim 14 wherein one end of said rotatable member is angled in order to mate with an end of one of said legs of said support structure in order to define an angle of 0 or 90 degrees.

16. A multi-purpose, multi-functional tool as defined in claim 1 wherein one end of said rotatable member extends beyond one of said legs upon the rotation of said rotatable member.

17. A multi-purpose, multi-functional tool comprising:

a support structure;

said support structure being of a predetermined thickness and of a substantially triangular-shaped configuration defining a pair of legs and a hypotenuse;

an edge member situated on one of said legs of said support structure, said edge member being of a predetermined width, said predetermined width being greater than said predetermined thickness of said support structure for supporting said support structure on a surface;

a first and second means for determining level located on said support structure adjacent each of said legs, respectively;

a rotatable member pivotally mounted on said support structure for selective rotational movement with respect thereto;

said rotatable member having means for determining level located thereon;

a curved extension protruding from said rotatable member, said curved extension having degree and rise markings thereon;

a locking mechanism operably interconnected with said curved extension to hold said rotatable member in a selected position with respect to said support structure;

means associated with said support structure for providing a reference for said markings located on said curved extension; and one end of said rotatable member extends beyond said edge member when being rotated such that when said rotatable member is rotated it can be fully used as a straight edge.

18. A multi-purpose, multi-functional tool as defined in claim 17 wherein said edge member extends beyond at least one of said legs, and one end of said rotational member extends beyond said edge member through a slot in said edge member.

* * * * *